H. B. HOGG.
AUTOMATIC PIPE LINE SUCTION VALVE.
APPLICATION FILED JUNE 8, 1908.

922,142.

Patented May 18, 1909.

Witnesses:

Inventor
Herman B. Hogg,

UNITED STATES PATENT OFFICE.

HERMAN B. HOGG, OF PARKERSBURG, WEST VIRGINIA.

AUTOMATIC PIPE-LINE SUCTION-VALVE.

No. 922,142. Specification of Letters Patent. Patented May 18, 1909.

Application filed June 8, 1908. Serial No. 437,286.

*To all whom it may concern:*

Be it known that I, HERMAN B. HOGG, a resident of Parkersburg, in the county of Wood and State of West Virginia, have invented certain new and useful Improvements in Automatic Pipe-Line Suction-Valves, of which the following is a specification.

The primary object of this invention is to provide a valve for the outlet of an oil tank which will close automatically when the tank is emptied and be held closed by the suction or vacuum in the line until the stop valve in the latter, outside of the tank, is closed by the gager.

Usually, the tanks of an oil field are located at different elevations, some on hills and others in valleys, as may be most convenient, and all are connected to the same pipe line system through which the oil is drawn off. With the gager drawing off several tanks at the same time, it is obvious that those at the higher elevations will empty first owing to the greater pressure, and without some means for automatically closing the outlets of the tanks first emptied, air in large volume will be drawn into the pipe line and partially or entirely offset the suction of the pumps at the receiving station. As a result, the tanks on the lower elevations will not be emptied, or if emptied the oil will go out very slowly. With the valve mechanism of the present invention, the outlet is closed the moment the tank is emptied, and the suction in the line holds it closed until released by the gager closing the stop valve outside of the tank. The valve is then free to open, automatically if provided with a float, and remain open until the tank is again emptied. The pull or suction of the pipe line is thus maintained, and it is unnecessary for the gager to closely watch the tanks as heretofore in order to close the discharge pipes when all of the oil has run out. And obviously, under the closest attention, it is impossible for the gager to promptly close each of several widely separated tanks at the proper moment. The result is that as heretofore practiced, he must either confine his attention to tanks located closely adjacent to each other, or else permit much air to be drawn into the pipe line.

A further feature of the invention is a screen or protector for the tank outlet, which is preferably carried by the improved valve and effectually screens the outlet at all times regardless of the position of the valve and prevents leaves and other refuse from being drawn into and obstructing the line.

Figure 1:
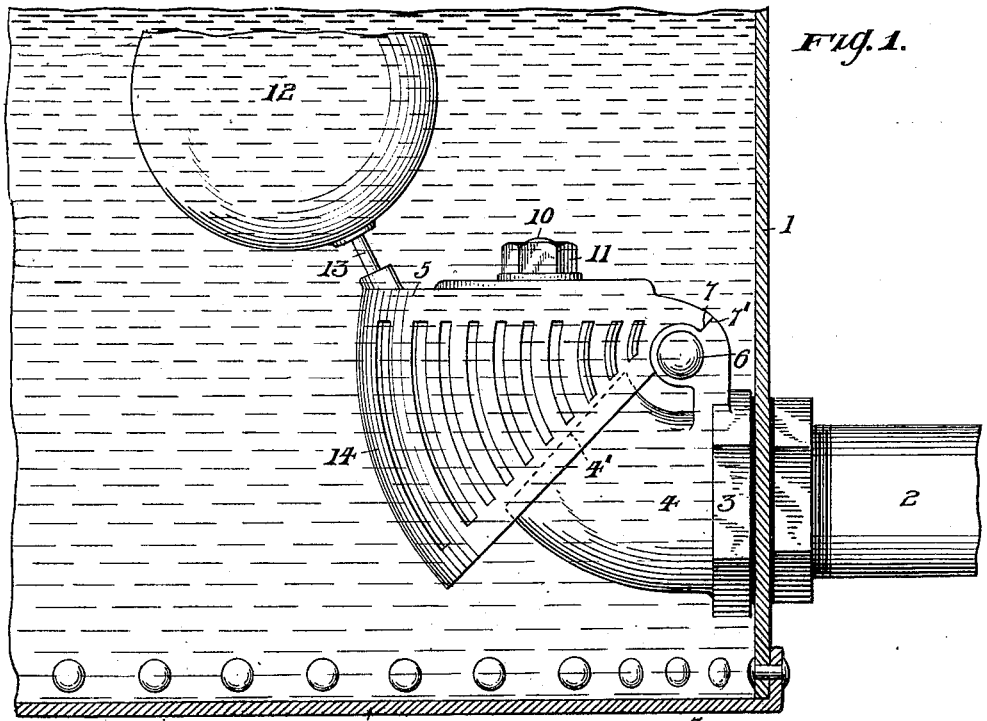
Figure 2:
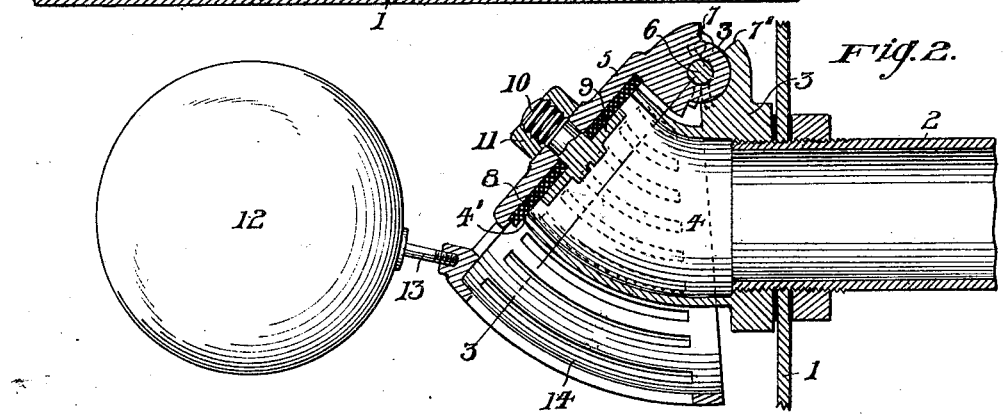
Figure 3:
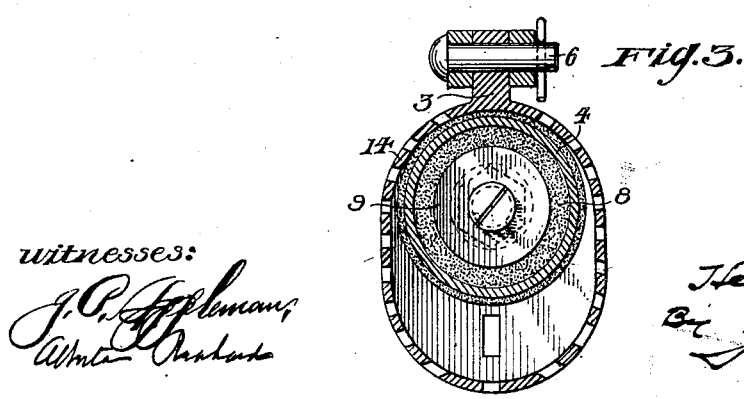

In the accompanying drawings, Figure 1 is a view in elevation of the valve mechanism, shown within a portion of a tank, and with the valve open as when there is sufficient oil to sustain the float. Fig. 2 is a vertical section of the valve, showing the same closed. Fig. 3 is a cross-section on line 3—3 of Fig. 2.

Referring to the drawings, 1 designates a portion of an oil tank, and 2 is the suction or discharge pipe leading therefrom and provided at any convenient point outside the tank with a gager's stop cock or valve (not shown). In the present adaptation, the extremity of the pipe is projected through the side wall of the tank and threaded into body 3 of the valve mechanism. Projecting inwardly from the body is the tubular extension 4, preferably of elbow form, with its outer open end forming a valve seat and preferably inclined, as shown. Extension 4 forms practically a continuation of pipe 3. Valve 5, which closes against seat 4', is hinged at 6 to the upper side of body 3, with coöperating stops 7 and 7' on the valve and body, respectively, for limiting the upward swinging or opening movement of the valve. To form a seal when the valve is closed, the latter is preferably provided on its inner or under face with leather 8, held in place by clamping head 9 carrying stem 10 which projects through the valve for receiving nut 11. With the valve thus mounted, the weight thereof holds it normally closed, as will be understood.

The valve-opening means consists preferably of a float 12 which, in the present instance, is shown connected to the free portion of the valve by stem 13. Obviously, when the oil is of sufficient depth to raise the float to the upward limit of its movement, the valve will be fully open and will remain open so long as a float-sustaining depth is maintained. When the oil is being drawn off and the level lowers toward the outlet so as to expose or partially expose the float, the latter will lower and finally close under its own weight and the influence of the outward suction through the outlet. And once closed it will be so held by the suction until the stop cock or valve (not shown) in the outlet pipe is closed by the gager. When the latter is closed, the hinged valve will open, provided there is sufficient depth of oil to float it, and remain open until the tank is again emptied.

For excluding leaves and other refuse from the outlet, the valve is provided with an open hood-like screen 14, which is preferably formed integral with the valve and depends therefrom in skirt form around the tubular extension 4. This hood-like screen is considerably larger than part 4, and is of such form as to fully inclose inlet end 4' thereof even when the valve is fully open, as in Fig. 1. The slotted sides and the open rear or under face of the hood afford an uninterrupted outflow of oil, and at the same time leaves and other refuse are prevented from being drawn into the pipe line.

While I have shown and described the invention as applied to oil tanks it may be variously used, and it will be understood that its structural features may be differently embodied without departing from the spirit and scope of the appended claims.

I claim:—

1. In a pipe line valve, the combination of the inlet end of the pipe extending into a tank, a valve closing said end when the tank is empty and a float for holding the valve open when not empty, and a hood-like screen carried by the valve and larger than the pipe and movable therearound when the valve moves, the screen being open at its end opposite the valve whereby when the valve is open oil may flow to the pipe through the said open end of the screen.

2. In a pipe line valve, the combination of a pipe extending into a tank and having an open and inclined inner extremity forming a valve seat, a valve having a hinge mounting at the upper side of the pipe and adapted to close against the inclined open extremity thereof, a float connected to the valve for raising the same, and a hood-like screen depending from the valve and embracing the pipe and protecting the open extremity thereof in all positions of the valve.

3. In a pipe line valve, the combination of a discharge pipe having an extension within a tank, a valve closing said extension, valve operating means, and a hood-like guard carried by the valve and larger than the pipe extension and movable therearound when the valve moves, the guard being open at its end opposite the valve whereby when the valve is open fluid may flow into the pipe extension through the said open end of the guard.

4. The combination of an oil tank, an outlet for the tank having a tubular extension within the tank, a valve hinged at its upper edge to raise when opening and to lower when closing, a float secured to the valve for opening the same and holding it open, means for limiting the opening movement of the valve, and a hood-like screen projecting from the valve backwardly over the tubular extension of the inlet, the screen being of such depth as not to move past the plane of the outlet extremity when the valve is fully open.

In testimony whereof I affix my signature in presence of two witnesses.

HERMAN B. HOGG.

Witnesses:
W. H. WOLFE, Jr.,
F. H. SIMPSON.